Inventor
Fred C. Eastman

Jan. 18, 1955     F. C. EASTMAN     2,699,851
VARIABLE SPEED INERTIA CONTROLLED MECHANISM
Filed May 16, 1951     3 Sheets-Sheet 3
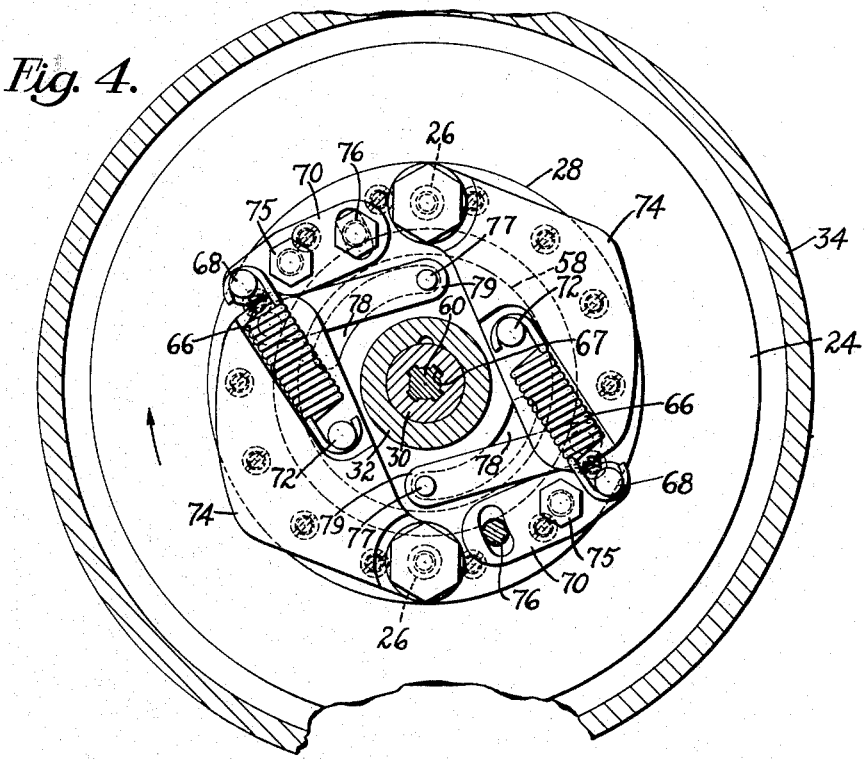
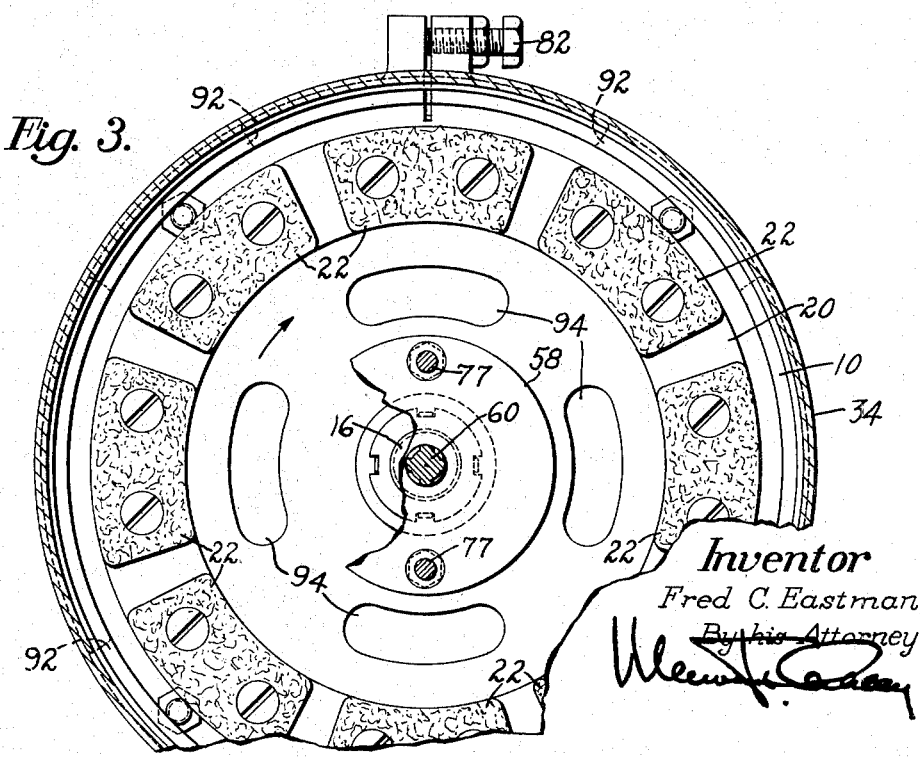
Inventor
Fred C. Eastman
By his Attorney

United States Patent Office 2,699,851
Patented Jan. 18, 1955

2,699,851

VARIABLE SPEED INERTIA CONTROLLED MECHANISM

Fred C. Eastman, Marblehead, Mass., assignor to United Shoe Machinery Corporation, Flemington, N. J., a corporation of New Jersey Application May 16, 1951, Serial No. 226,659

13 Claims. (Cl. 192—18)

This invention relates to improved driving and stopping mechanisms for actuating machines from a source of power rotating with a uniform speed, and more particularly to that type of mechanism which is controlled by a foot treadle for varying the speed of operation in a sewing or similar machine having nonuniform load characteristics, in which a smooth speed regulation is desirable from the maximum speed of the source of power, as high as eighteen hundred revolutions per minute to a minimum as low as ten revolutions per minute.

The usual form of treadle controlled driving mechanism of the type referred to is provided with a friction clutch and a friction brake selectively controlled through directly acting treadle connections. In operating a machine at minimum average speed it is necessary to actuate the treadle connections with a series of rapid oscillations, the extremities in the strokes of which alternately affect the clutch and the brake. Each oscillation is of such short duration that the machine is accelerated only slightly above the desired average speed before the driving action is interrupted and then the speed drops slightly below, the variation occurring in rapid succession. At best the operation of the machine varies alternately above and below the desired speed primarily because the oscillation of the treadle connections causes the clutch to accelerate the machine and the brake to decelerate it in rapid succession. Furthermore, oscillation of the treadle connections requires considerable exertion and skill on the part of an operator for effective speed regulation.

It is the primary purpose of the present invention to provide a simple and effective mechanical driving and stopping mechanism with treadle control which will not require rapid oscillation of its treadle connections and which may be controlled readily by a relatively inexperienced operator to give a smooth non-varying operation of the driven machine of the type referred to even at the minimum desired speed.

In an attempt to control speed without oscillating treadle control connections for any friction clutch, difficulties have been encountered as a result of the tendency for the mechanical driving action of the clutch to produce vibration or chattering, particularly where a speed regulation is desired with a relatively large slippage in the clutch. The same difficulties are encountered in the use of a friction brake where it is applied while operating at high speeds. In some instances attempts have been made to control the application of a friction clutch or a brake in part through the use of a centrifugal governor but not without encountering the same difficulties. Accordingly, it has been assumed that the practical benefit obtained in using a centrifugal governor is not justified in the control of a friction clutch or a friction brake intended to be actuated continuously with high relative speeds between the frictionally engaging parts.

In the accomplishment of an important object of the invention, a centrifugally controlled friction driving and stopping mechanism is provided, in which the tendency to vibrate and chatter is avoided, even at high relative speed differences between the friction members, thus preserving a smoother non-varying operation of a machine driven thereby than has been possible heretofore.

To the ends above noted the present invention contemplates the provision of a non-centrifugal inertia controlled member and a centrifugal governor interposed between the treadle actuated connections on the one hand and the clutch or brake on the other hand to modify the action of the clutch or brake in accordance with the acceleration of the clutch or the deceleration of the brake. Such arrangement is advantageous in that it enables transmission of a more uniform torque to the operated machine than is possible with a simple treadle actuated connection, while at the same time the speed of rotation may be kept substantially constant, thus avoiding the necessity of rapid oscillation in the treadle actuated connections, especially where the operation of the machine introduces a non-uniform load on the driving mechanism. For instance, in a sewing machine the penetration of the needle through the work requires a momentarily greater torque than is needed in other parts of a sewing cycle. This greater torque requires heavier clutch pressure in order to maintain a uniform speed of operation. With the inertia member the action of the machine in attempting to slow down as a result of greater torque requirement automatically increases the pressure on the clutch until the requirement is satisfied.

More specifically this feature of the invention includes the use of a control rod mounted concentrically with the center of rotation of the clutch and the inertia member is supported on the rod in a manner to impart relative endwise movement between the rod and the clutch whenever the speed of rotation of the clutch is changed momentarily. If the resistance to operation of the driven machine is momentarily reduced, as when the needle of a sewing machine completes its penetration of the work, the machine tends to increase its speed but the action of the inertia member through the control rod reduces the pressure on the clutch automatically so that the speed of operation remains substantially the same with fixed positions of the treadle connections. If the tendency to increase the speed is sufficiently great momentary pressure is applied to the brake also to offset the increase.

Preferably the centrifugal governor has fly weights operatively connected with the treadle actuated connections. The combination of the inertia member and centrifugal governor produces an unusually smooth speed regulation practically eliminating the necessity of quick movements in the treadle controlled connections at any time so that an inexperienced operator will be able to regulate the speed of a sewing or similar non-uniform load machine without an extended training period.

These and other features of the invention, as hereinafter described and claimed, will be apparent from the following detailed description taken in connection with the accompanying drawings, in which:

Fig. 3 is a sectional view partly broken away, taken along the line III—III of Fig. 2, and Fig. 4 is a similar view taken along the line IV—IV of Fig. 2.

Figure 1:
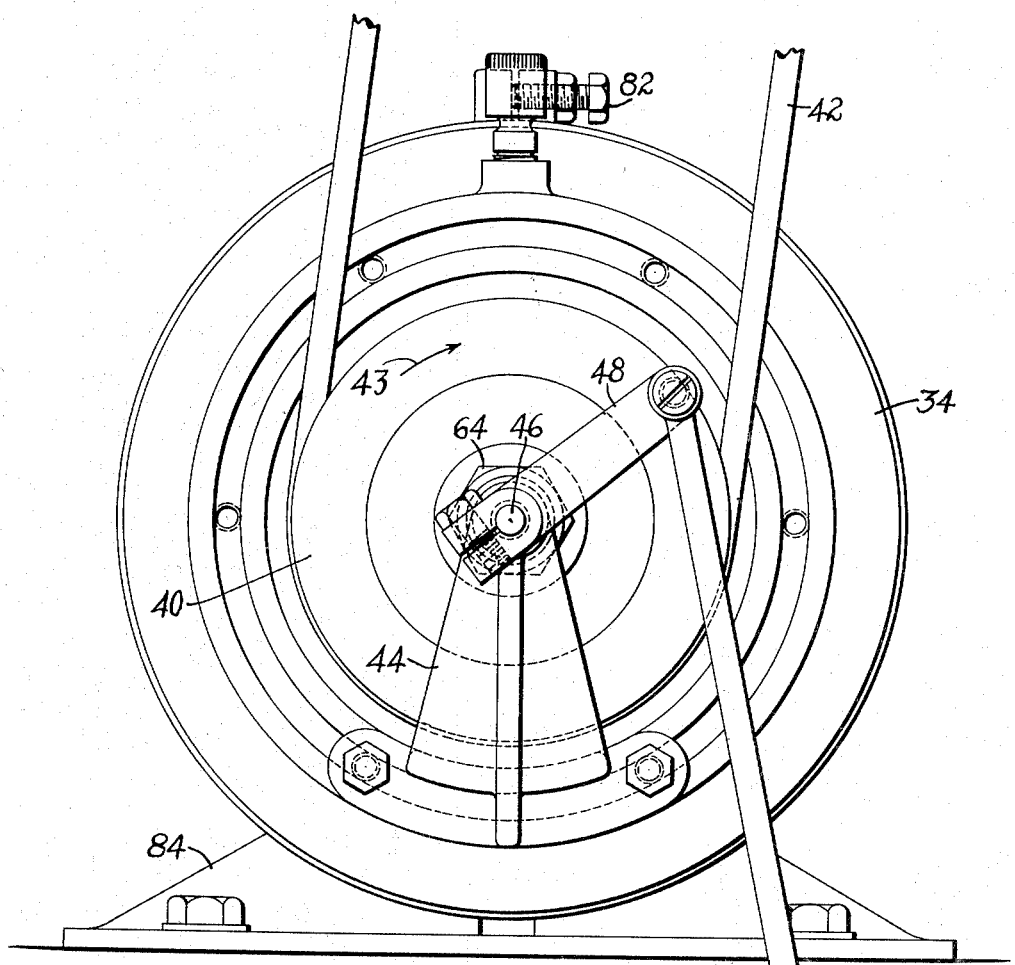
Fig. 1 is a view in end elevation of a driving and stopping mechanism including treadle control connections embodying the features of the present invention.
Figure 2:
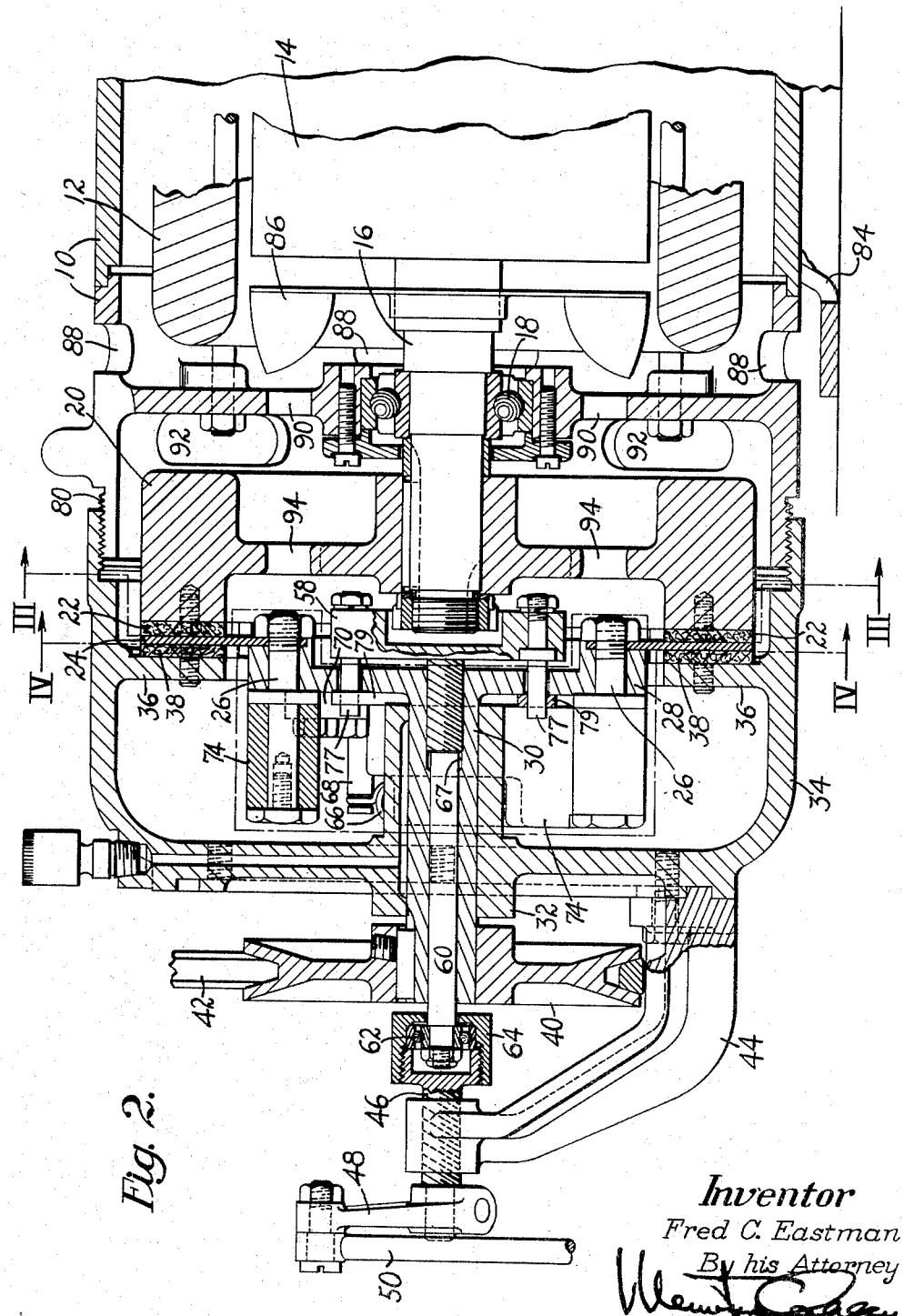
Fig. 2 is a cross-sectional view of the mechanism illustrated in Fig. 1 taken along a plane passing through the center of rotation of the mechanism.

The illustrated mechanism is intended primarily for operating a sewing machine and includes a self contained source of power rotating at a uniform speed of approximately 1800 revolutions per minute. The regulation of speed is obtained wholly by frictional engagement and pressure between a driven clutch member, a driving clutch member and a brake, there being a suitable forced air draft ventilation system in the mechanism to carry off the frictional heat produced. The clutch and brake are selectively controlled by treadle actuated connections and are so arranged that rapid oscillation of the treadle connections is unnecessary even at extremely low operating speeds in the driven member of the clutch, variations in torque requirements for a uniform speed of operation being compensated for automatically by a centrifugal governor while the treadle connections remain in fixed positions. With the illustrated machine it is possible to obtain the full application of maximum available torque from the source of rotating power at any speed throughout the entire range of desired speed regulation regardless of treadle connection movement, a simple direct control movement from one regulating position to another only being required.

The source of rotating power comprises a uniform speed electric motor mounted in a main two-part casing 10 with stator coils 12 and a rotor 14. The rotor is secured to a driving shaft 16 mounted in bearings, one of which is indicated at 18. Keyed to the driving shaft 16 is a fly wheel 20 comprising the driving member of the clutch and having a facing 22 composed of friction segments disposed to engage a driven clutch plate 24.

The driven clutch member comprises the clutch plate 24 clamped by bolts 26 to a disk 28 formed at the inner end of a hollow driven clutch shaft 30 rotating in a fixed bearing 32 formed in an end housing cap 34. The brake also is formed in the end housing cap and consists of an internal flange 36 provided with a facing 38 of friction segments cooperating with the side of the clutch plate 24 opposite from that engaged by the driving clutch member. At the outer end of the driven clutch shaft 30 is a driven V-belt pulley 40 engaged by a belt 42 running to a sewing or similar type of non-uniform load machine (not shown), the motor driving the pulley 40 in the direction of the arrow 43 in Fig. 1.

For varying the speed of operation of the machine and for selectively actuating either the clutch or brake the treadle actuated connections are mounted on the end clutch housing cap 34 which has secured to it a fixed bracket 44 provided with a threaded hub within which is engaged a threaded stud 46 alined with the clutch shaft 30. At the outer end of the stud 46 is clamped a clutch controlling arm 48. The clutch arm 48 has pivotally connected to it a treadle connected link 50 the lower end of which is similarly connected to a treadle 52 rotatably mounted on a pivot 54 secured in a floor bracket 56.

With prior treadle controlled friction clutch and brake mechanisms regulation of the rotational speed in the driven clutch member and pulley, corresponding to that indicated at 40, has been accomplished by rapid oscillation of the treadle with its connections, the rapidity of oscillation and the range of movement only being effective in obtaining the desired results. Where it is necessary to drive a machine at relatively low speeds, such as a minimum of approximately ten revolutions per minute, oscillation of the treadle must be extremely rapid and of short range, requiring large muscular exertion and extensive experience on the part of the operator.

When the needle is brought into engagement with the work in starting a new seam it may be desirable to stop the machine or to insert a single stitch and then to stop the machine with the needle raised in order to readjust the work. The torque imparted to the driving clutch member during penetration of the needle into the work is substantially greater than at any other part of a sewing cycle. If a uniform torque is applied through the clutch the machine will rapidly accelerate as soon as the needle penetration has been completed and the machine will be operated past the desired stopping point or it must be turned by hand. To avoid turning the machine by hand in bringing it to rest at the desired stopping point it is necessary to terminate the driving torque simultaneously with the end of the needle penetrating movement. For this purpose the treadle connections must be actuated with such rapidity that the needle will not have time to re-engage the work during a single treadle oscillation. In spite of all efforts it is often impossible to operate a sewing or similar non-uniformly loaded machine with sufficiently low speed or to bring it to rest in a desired position, either with the needle raised to its point of highest movement or in engagement with the work and with the other parts of the machine in proper relation to enable the work to be manipulated in a desirable manner.

To accomplish with certainty a uniform and easily controlled speed regulation of a machine driven by the illustrated mechanism, in accordance with the present invention, the treadle connections and the driven clutch member 24, 28 have interposed between them a non-centrifugal inertia controlled member 58 rotated by the driven member of the clutch. The inertia member is in the form of a weighted wheel secured on the inner end of a threaded clutch control rod 60 rotatably mounted within the hollow shaft 30 concentrically with the driven clutch member. The outer end of the control rod has secured to it a thrust bearing 62 clamped within a dished nut 64 engaging a threaded cup portion of the treadle stud 46. Actuation of the treadle connections through the arm 48 moves the rod 60 lengthwise as the connections are operated and shifts the hollow shaft 30 supporting the driven clutch member to bring the clutch plate selectively into engagement with the driving clutch facing 22 and the brake facing 38. When the treadle is depressed at its rearward end by the toe of the operator the clutch plate engages the driving clutch member and pressure on the forward end of the treadle by the heel of the operator causes the brake to be applied.

Where the torque transmitted by a clutch controlled only by a treadle connection approaches that of the capacity of the clutch facings and the speed of rotation is at a minimum it is a practical impossibility to avoid vibration and chattering particularly after the clutching surfaces have been worn smooth with a high polish. Under such conditions excessive force is exerted through the treadle connections in an attempt to drive the machine faster than is possible with the torque available. Such vibration and chattering is due in part to inherent elasticity between segregated masses in the operated parts of the driving mechanism and the machine driven thereby. In the illustrated mechanism, the driven member of the clutch constitutes a mass of material separated from the mass of the driven machine by a somewhat resilient belt 42. The resiliency of the belt connecting these masses enables vibrations to be set up easily within a natural frequency range peculiar to the characteristics of the masses and belt. Any impulse applied to such resiliently connected mass system may become amplified and resonated thereby, the driven clutch member being momentarily accelerated and decelerated in rapid succession at a given frequency.

To limit the force applied by the treadle connections the threaded portion of the control rod 60 has steep pitch threads which engage an internally threaded bearing 67 in the hollow shaft 30 to cause relative lengthwise movement between the control rod and the clutch shaft upon relative rotary movement of the inertia member and the clutch disk. The direction and pitch of the engaged threads are such that upon acceleration of the driven clutch member the clutch disk 28 rotates relatively to inertia member 58 and automatically retracts the plate from the driving clutch member. Upon deceleration the clutch plate will be forced momentarily in the opposite direction with increased pressure against the driving clutch member. Thus, vibration of the driven clutch member is neutralized while at the same time the average pressure of the clutch plate on the driving member is directly controlled by the treadle connections.

A similar action takes place between the driven clutch plate 24 and the brake, the inertia member 58 being arranged to run ahead of the driven clutch member and to move the clutch plate 24 momentarily away from the brake in a manner to limit the braking force. If the tendency towards vibration and chattering is sufficiently great the inertia member may move the clutch plate alternately into engagement with the driving clutch member and the brake, the treadle connections remaining stationary.

To retain the inertia member 58 in a neutral position so that it will be responsive equally to either excessive acceleration or deceleration throughout its intended speed range of operation it is connected to a resilient system including a pair of tension springs 66 each having one end engaging a pin 68 projecting from an adjusting lever 70 supported by the disk 28 of the driven clutch member. The other end of each spring 66 is similarly engaged with a pin 72 (see Fig. 4) carried by a fly weight 74 pivotally mounted on an extension of each bolt 26 and connected to the inertia member 58. The springs 66 thus draw the flyweights together toward the shaft 30 of the driven clutch member and toward positions where their masses are least subject to changes in acceleration forces. The respective pins 68 and 72 are so arranged that they are in alinement with the corresponding bolt 26 when the driven clutch member is at rest, the fly weights being formed with recesses to provide clearance spaces for the springs. For adjusting the springs 66 the levers 70 are pivoted on bolts 75 carried by the clutch disk 28 and are secured in adjusted positions by clamp bolts 76 passing through slots in the levers and into threaded engagement with the clutch disk.

The fly weights 74 and the springs 66 comprise a centrifugal governor acting with the mass of the inertia member 58 both to reduce momentary changes of speed in the clutch as well as to provide means for maintaining the speed of a driven clutch member substantially constant for the given position of the treadle controlled connections. By the construction illustrated the inertia member and governor act in the same manner to control the clutch and brake but at different times. If the pulley 40 is at rest and the clutch arm 48 actuated in a counter-clockwise direction, as viewed in Fig. 1, the clutch plate 24 will be pressed against the flywheel 20 and the pulley 40 started in rotation. The inertia member acts during acceleration of the driven clutch member to keep the pressure on the clutch within the limits of available torque. As soon as the pulley reaches a speed at which the fly weights of the governor move outwardly to the proper positions the control rod 60 and the hollow shaft 30 will be rotated relatively to each other, causing the threaded portion of the rod to rotate the inertia member and to move the clutch plate away from the flywheel until it becomes disengaged. With no further movement of the controlling arm 48 the pulley 40 will be rotated uniformly at the same speed regardless of the load applied without any tendency to vibrate or chatter. If the controlling arm is returned to a position to stop the clutch plate 24, the plate will be pressed against the brake facing 38 and the fly weights of the governor will move inwardly until the control rod 60 is moved lengthwise in a direction to disengage the plate 24 from the brake facing. However, such engagement with the brake actually may not occur in bringing the machine to rest but the pressure of the clutch plate on the facing may be so reduced that the pulley 40 stops by itself. If the brake is applied its action also is affected by the inertia member 58 to prevent vibration and chattering through lengthwise movement of the control rod in forcing the clutch plate away from the brake facing by reason of the threaded portion of the rod rotating in the shaft 30. Forcing the clutch plate away from the brake facing in this way keeps the braking torque effectively within the limits of the brake facing capacity.

It has been found that while it may be desirable in some instances to arrange the centrifugal governor in such a way that it is effective throughout the entire range of speed imparted to the driven pulley 40, in actual operation of the present starting and stopping mechanism satisfactory results can be obtained if the centrifugal governor is operative only at the lower speeds of rotation of the pulley 40. Good results have been obtained if the fly weights of the governor reach the limit of their outward movement at a pulley speed of 325 revolutions per minute where the maximum speed of the driving motor is 1800 revolutions per minute. If a smooth uniform speed regulation can be obtained in that part of the speed range where the greatest slippage occurs between the clutch plate and the fly wheel no practical difficulty from vibration or chattering occurs throughout the remaining portion of the speed range. Furthermore, the reaction of the centrifugal governor when its range of speed regulation is limited results in a desirable reduction in the total movement of the treadle control connections from the low speed portion of the range to the maximum number of revolutions per minute.

To limit the action of the centrifugal governor and to provide connections with the inertia member 58, the inertia member has projecting from it a pair of parallel pins 77 extending through slots 78 (see Fig. 4) in the disk 28 and into engagement with the ends of a pair of links 79 connecting the pins with pivots on the extreme free ends of the fly weights. The lengths of the slots 78 in a circumferential direction is such that when the pins 77 reach the ends of the slots opposite those where they are located in Fig. 4, a speed of 325 revolutions per minute will have been reached and thereafter any increase of speed in the clutch will be controlled only by the foot treadle connections. This is a desirable arrangement where it is necessary to run a machine at relatively slow speed at certain times and at other times to run it at maximum possible speed. In this way a smoothly controlled low speed regulation is obtainable without vibration or chattering either in starting or stopping and the full benefit of a positively controlled friction clutch is obtainable at high speeds.

Since the rotor 14 of the motor revolves at a substantially uniform speed the greatest difficulty in speed regulation is met in operating at the slowest possible sewing speed when the highest slip takes place in the driving clutch. The difficulty of operating at the slowest speed is primarily because of momentary inertia effects from rapid acceleration and deceleration. For this reason it is desirable to arrange the connections between the inertia wheel in such a way that a greater speed control action is obtained therefrom than is obtained by the centrifugal speed governor. Accordingly, the bolts 26 on which the flyweights 74 are pivotally mounted are located on the disk 28 near its outer periphery and the flyweights are so arranged that when drawn together by the spring 66 their centers of mass are approximately in circumferential alinement with the centers of the bolts 26. In this position of the weights 74 their movements about the bolts 26 are not affected by acceleration or deceleration. However, the action of the inertia wheel under these conditions is greatly amplified, since the links 79 are connected with pivots on the extreme free ends of the flyweights. Thus, the weighted wheel is able to move the flyweights more readily when they are drawn together than when they are separated with the driven clutch member running at a higher speed. Accordingly, the amplified action of the inertia wheel improves the smooth vibration-free speed regulation in the low speed portion of the automatic regulated range.

For purposes of convenient assembly and adjustment of the clutch the housing cap 34 is provided with an internally threaded portion engaging external threads 80 on the main casing 10. To assemble the housing cap 30 the threads on the parts are engaged and the cap rotated until the clutch plate 24 is pressed by the fly wheel facing 22 lightly against the brake facing 38. With an adjustment of the controlling arm 48 in which a positive pressure is maintained between the clutch plate 24 and the brake facing 38 the fly wheel facing 22 will be free of the clutch plate and the motor may be rotated at speed without frictional drag. The end housing 34 may then be locked in properly adjusted position by tightening a set screw 82 (see Fig. 3) threaded into a lug on the main casing and arranged to engage a second lug on the casing to force the lugs apart and expand the threaded portion 80 into clamping relation with the internal threads on the housing cap. For convenience in mounting the main casing it is provided with a base bracket 84.

The forced draft ventilation system comprises an impellor 86 on the motor shaft 16 acting to induce a draft of air radially from the motor shaft 16 out through a series of openings 88 in the main casing 10. The air passing the impellor is in part drawn through openings 90 in a radial partition in the main casing 10 which supports the motor bearing 18 and from a series of inlets 92 in the main casing outside the partition. Air is also drawn by the impellor through openings 94 in the fly wheel 20 from between the friction surfaces of the clutch plate and the fly wheel. Thus, the frictionally engaging members of the clutch are arranged for proper cooling and dust particles worn from the frictional facings are removed from the mechanism.

The nature and scope of the invention having been indicated and a particular embodiment having been described what is claimed is:

1. A speed control mechanism having a driving member, a driven clutch member, and treadle connections for actuating the driven clutch member toward and from the driving clutch member, in combination with a noncentrifugal inertia controlled member rotated by the driven clutch member and a centrifugal governor rotated by the driven clutch member, both said inertia controlled member and governor being operatively interposed between the treadle actuated connections and the driven clutch member to limit the force applied by the treadle connections to the clutch in accordance with both the momentary acceleration of the clutch and the constant speed of the driven clutch member.

2. A speed control mechanism having a clutch and treadle connections for actuating the clutch, in combination with a noncentrifugal inertia controlled wheel rotated by the clutch and interposed between the treadle actuated connections and the clutch to limit the force applied by the treadle connections to the clutch in accordance with the acceleration of the clutch, and resilient means for retaining the inertia wheel in a neutral position comprising a centrifugal governor supported by the clutch and connected to the inertia wheel.

3. A speed control mechanism having a clutch and treadle controlled connections for actuating the clutch, in combination with an inertia controlled member interposed between the treadle actuated connections to limit the force applied by the treadle connections to the clutch in accordance with the acceleration of the said member, a control rod arranged to support the inertia member and mounted concentrically to the clutch, a threaded bearing for the control rod in the clutch to cause relative lengthwise movement between the rod and the clutch upon relative rotation of the inertia member, and resilient means for yieldingly maintaining the inertia member in a neutral position comprising a centrifugal governor supported by the clutch and connected to the inertia member.

4. A speed control mechanism having a clutch disk, a driving clutch member, a brake, a centrifugal governor on the clutch disk and treadle control connections for actuating the clutch disk selectively toward and from the driving member and the brake, in combination with an inertia wheel rotated by the clutch disk, a control rod concentric to the axis of rotation of the clutch disk to which the inertia wheel is connected and through which the treadle connections act, and connections between the inertia wheel and the centrifugal governor to cause relative lengthwise movement between the rod and the clutch disk upon relative rotary movement between the inertia wheel and the clutch disk.

5. A speed control mechanism having a clutch disk, a driving clutch member, a brake, a centrifugal governor on the clutch disk and treadle control connections for actuating the clutch disk selectively toward and from the driving member and the brake, in combination with an inertia wheel rotated by the clutch disk, a control rod concentric to the axis of rotation of the clutch disk to which the inertia wheel is connected and through which the treadle connections act, connections between the inertia wheel and the centrifugal governor to cause relative lengthwise movement between the rod and the clutch disk upon relative rotary movement between the inertia wheel and the clutch disk, and means for limiting relative rotary movement between the inertia wheel and the clutch disk to a portion only of the speed range of the clutch disk between low and a maximum number of revolutions per minute.

6. A speed control mechanism having a clutch disk, a driving clutch member, a brake, a centrifugal governor on the clutch disk and treadle control connections for actuating the clutch disk selectively toward and from the driving member and the brake, in combination with an inertia wheel rotated by the clutch disk, a control rod concentric to the axis of rotation of the clutch disk on which the inetria wheel is mounted and through which the treadle connections act, connections between the inertia wheel and the centrifugal governor to cause relative lengthwise movement between the rod and the clutch disk upon relative rotary movement between the inertia wheel and the clutch disk, and means for limiting relative rotary movement between the inertia wheel and the cluth disk to a portion only of the speed range of the clutch disk between low and a maximum number of revolutions per minute, comprising a pin carried by the inertia wheel and a slot in the clutch disk through which the pin projects.

7. A speed control mechanism having a clutch disk, a shaft with which the clutch disk rotates, a driving clutch member, a brake, a centrifugal governor on the clutch shaft and treadle controlled connections for actuating the clutch disk selectively toward and from the driving member and the brake, in combination with an inertia actuated member, a control rod concentric to the axis of the clutch shaft on which the inertia member is mounted, said control rod having a threaded portion engaging threads on the clutch shaft, and pins connecting the inertia member and the centrifugal governor to cause relative rotational and relative endwise movement between the control rod and the clutch shaft upon movement of the inertia member.

8. A speed control mechanism having a clutch disk, a shaft with which the clutch disk rotates, a driving clutch member, a brake, a centrifugal governor on the clutch shaft and treadle controlled connections for actuating the clutch disk selectively toward and from the driving member and the brake, in combination with an inertia actuated member, a control rod concentric to the axis of the clutch shaft on which the inertia member is mounted, said control rod having a threaded portion engaging threads on the clutch shaft, pins connecting the inertia member and the centrifugal governor to cause relative rotational and relative endwise movement between the control rod and the clutch shaft upon relative movement between the inertia member and the clutch disk, a stud threadedly engaging a fixed bracket, and an arm of the treadle controlled connections on the stud for moving the control rod endwise.

9. A speed control mechanism having a clutch disk, a shaft with which the clutch disk rotates, a driving clutch member, a brake, a centrifugal governor on the clutch shaft and treadle controlled connections for actuating the clutch disk selectively toward and from the driving member and the brake, in combination with an inertia actuated member, a control rod concentric to the axis of the clutch shaft on which the inertia member is mounted, said control rod having a threaded portion engaging threads on the clutch shaft, pins connecting the inertia member and the centrifugal governor to cause relative rotational and relative endwise movement between the control rod and the clutch shaft upon relative movement between the inertia member and the clutch disk, a stud threadedly engaging a fixed bracket, an arm of the treadle controlled connections on the stud for moving the control rod endwise, said stud and control rod being disposed in alinement, and a thrust bearing connecting the stud and rod to enable the control rod to rotate with relation to the clutch shaft while the stud remains stationary.

10. A speed control mechanism having a clutch, a brake and treadle control connections for applying pressure to both the clutch and the brake, in combination with a centrifugal governor rotated by the clutch having fly-weights operatively connected with the treadle connections to modify the pressure on the clutch or brake by the connections in accordance with the speed of rotation of the governor and an inertia wheel rotated by the clutch and operatively connected to the treadle connections to modify the pressure of the clutch or brake further in accordance with the acceleration or deceleration of the clutch.

11. A speed control mechanism having a driving clutch member, a driven clutch member, a brake member, between which brake member and the driving clutch member the driven clutch member is movable, and treadle connections for actuating the driven member selectively into engagement with either the driving clutch member or the brake member, in combination with an inertia controlled member rotated by the driven clutch member and a centrifugal governor rotated by the driven clutch member, both said inertia member and governor being operatively interposed between the treadle connections and the driven clutch member to limit the force applied by the treadle connections to the driven clutch member both while engaging the driving clutch member and the brake member.

12. A speed control mechanism having a driving clutch member, a driven clutch member, a brake member, between which brake member and the driving clutch member the driven clutch member is movable and treadle connections for actuating the driven member selectively into engagement with either the driving clutch member or the brake member, in combination with an inertia controlled member rotated by the driven clutch member, comprising a weighted wheel rotatably mounted concentrically with the driven clutch member and a centrifugal governor rotated by the driven clutch member and comprising a disk connected to the driven clutch member, bolts on the disk, flyweights pivotally mounted on the bolts, and springs for drawing the flyweights together where their masses are least subject to forces of acceleration, and connections at the extreme ends of the flyweights with the weighted wheel to cause the weighted wheel to move the flyweights more readily when they are drawn together than when they are separated.

13. A speed control mechanism having a driving clutch member, a driven clutch member, a brake member, between which brake member and the driving clutch member the driven clutch member is movable and treadle connections for actuating the driven member selectively into engagement with either the driving clutch member or the brake member, in combination with an inertia controlled member rotated by the driven clutch member, comprising a weighted wheel rotatably mounted concentrically with the driven clutch member and a centrifugal governor rotated by the driven clutch member and comprising a disk connected to the driven clutch member, bolts on the disk, flyweights pivotally mounted on the bolts, springs for drawing the flyweights together where their masses are least subject to forces of acceleration, connections at the extreme ends of the flyweights with the weighted wheel to cause the weighted wheel to move the flyweights more readily when they are drawn together than when they are separated, and pins on the flyweights and the disk respectively to which the ends of each spring are connected, the pins being arranged to be brought into alinement with the flyweight pivot bolts when the driven clutch member is at rest.

References Cited in the file of this patent

UNITED STATES PATENTS

| | | |
|---|---|---|
| 1,841,284 | Gillett | Jan. 12, 1932 |
| 1,881,941 | Putney | Oct. 11, 1932 |
| 2,109,420 | Guernsey | Feb. 22, 1938 |
| 2,205,622 | Fossa | June 25, 1940 |

FOREIGN PATENTS

| | | |
|---|---|---|
| 731,929 | France | Sept. 10, 1932 |